Jan. 11, 1955

G. E. WILLIAMS 2,699,515

LAMP CONSTRUCTION

Filed Aug. 21, 1953

Gordon E. Williams
INVENTOR.

BY
Attorneys

Jan. 11, 1955
G. E. WILLIAMS
2,699,515
LAMP CONSTRUCTION
Filed Aug. 21, 1953
2 Sheets-Sheet 2
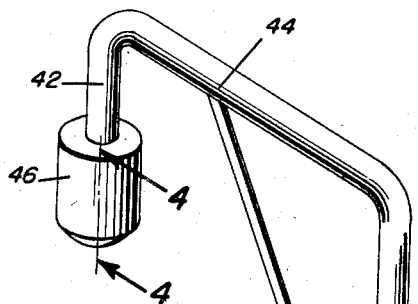
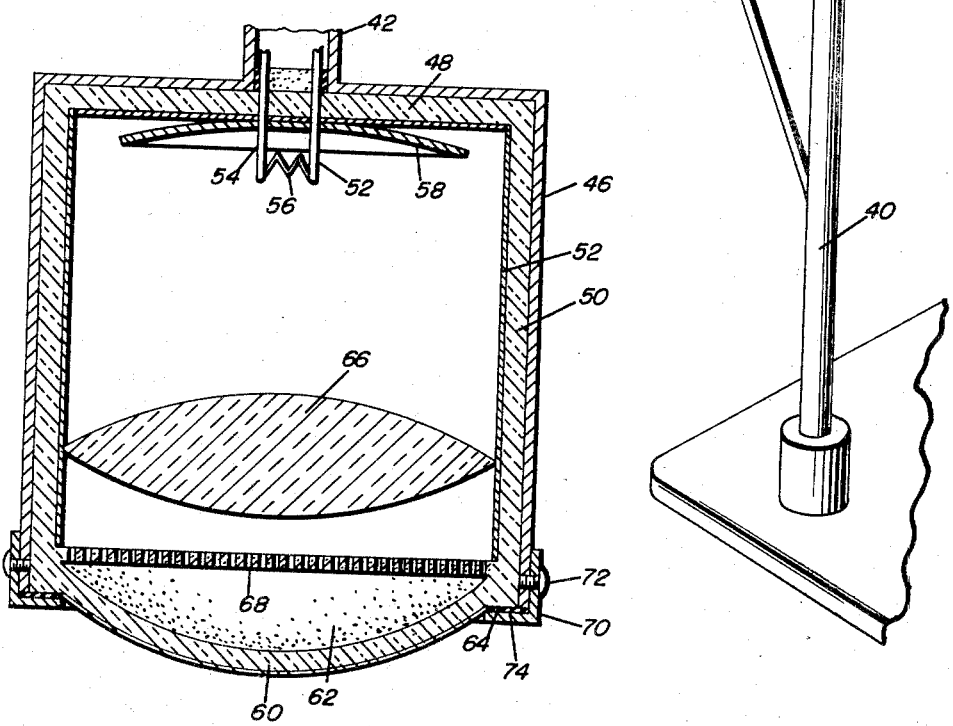
Gordon E. Williams
INVENTOR.

United States Patent Office 2,699,515
Patented Jan. 11, 1955

2,699,515

LAMP CONSTRUCTION

Gordon E. Williams, Athol, Mass.

Application August 21, 1953, Serial No. 375,712

2 Claims. (Cl. 313—111)

This invention relates to lamp construction and particularly to a novel development in illumination which is adaptable for use in street lighting, airport runways, house lighting, besides being especially adaptable for use on motor vehicles.

The primary object of the present invention resides in the provision of means for substantially reducing the glare emanating from vehicle head lights or other types of illuminating lamps without substantially reducing the amount of illumination provided thereby or the area of coverage afforded by the head lights or other illuminating lamps.

The construction of this invention features the use of a sealed casing having incorporated therein a ground glass lens, a novel filter, and a condensing lens whereby light rays will emanate from the lamp without causing a glare by the controlled path afforded by the various elements of the invention. The interior surface of the casing is coated with a dull, preferably black, non-reflecting finish except for that portion immediately behind the filament used as a light source.

Still further objects and features of the invention reside in the provision of an illuminating lamp especially adapted for construction and utilization as a "sealed beam" type of lamp, which is strong and durable, yet which may be comparatively cheaply manufactured and, which, as is very important, requires only a single filament thereby avoiding the expensive installation as on motor vehicles of dimmer switches and multi-filament head lights.

These, together with the various ancillary objects and features of the invention which will become apparent as the following description proceeds, are attained by this lamp construction, preferred embodiments of which have been illustrated in the accompanying drawings, by way of example only, wherein:

Figure 3 is a perspective view showing an embodiment of the invention for use in street lighting; and Figure 4 is an enlarged, vertical, sectional view as taken along the plane of line 4—4 in Figure 3.

Figure 1:
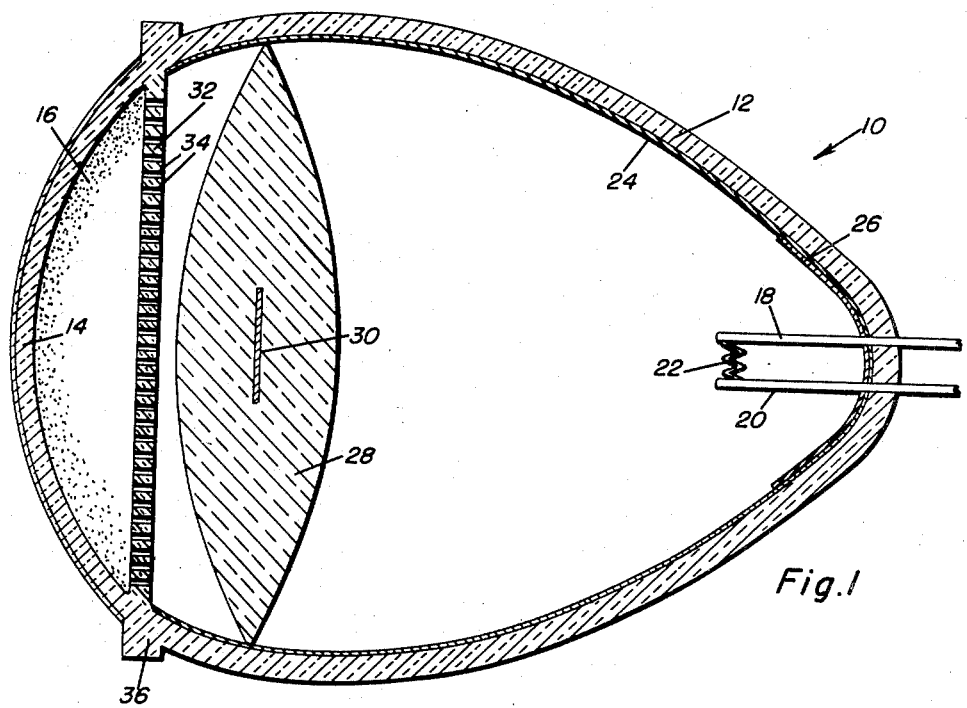
Figure 1 is a sectional, detail view of a head light constructed in accordance with the concepts of the present invention.
Figure 2:
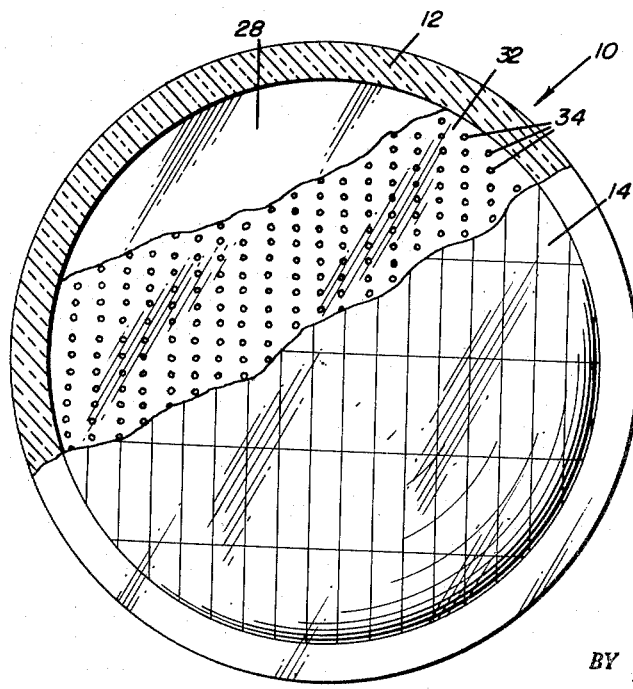
Figure 2 is a front elevational view of the head light with parts thereof being broken away to show other parts in greater detail.

With continuing reference to the accompanying drawings wherein like reference numerals designate similar parts throughout the various views, and with initial attention to Figures 1 and 2, it will be noted that herein is illustrated an embodiment of a vehicle head light generally designated by reference numeral 10. Any suitable material or materials may be utilized in constructing the vehicle head light 10. The head light 10 includes a casing 12 of a suitable configuration which includes a lens portion 14 provided with a ground glass surfacing 16 on the interior surface thereof. The outer surface of the lens 14 or the entire lens itself may be colored with an amber tint or other suitable color so that the illumination emanating from the head lights will be better able to penetrate fog. Extending through the casing 12 and embedded therein are sleeves 18 and 20 which carry a filament 22 which when heated provides the source of illumination.

The casing 12 is provided with a coating 24 of a dull, non-reflecting, preferably black, material which may be baked thereon. Other non-reflecting surfaces can be utilized in lieu of the black coating, but such has been found to be preferable. A lead surfacing 26 is provided immediately behind the filament 22.

Positioned within the casing 12 and between the source of illumination 22 and the lens 14 is a condensing lens 28 which, as shown in Figure 1, is a convex lens capable of focusing the various light rays emanating from the light source 22 in a comparatively tight beam. A disc 30 may be incorporated in the condensing lens 28. The disc 30 is formed from a non-transparent material thereby preventing the condensing lens 28 from focusing the light rays at too high an intensity. There is also provided a filter 32 positioned between the condensing lens 28 and the lens 14 which filter may be formed of glass or other suitable material and which has a plurality of rows of apertures 34 therein adapted to permit passage of light. The space rows of apertures 34 and the other light transmitting portions of the filter 32 will direct the rays of light emanating from the condensing lens 28 in a comparatively straight beam. Hence, an anti-glare illumination will emanate from the head light 10. It is to be known that the casing 12 may be provided with a peripheral flange 36 for aiding in attaching this "sealed beam" type of head light within the mounting provided therefor.

Referring now to the embodiment of the invention as illustrated in Figures 3 and 4, which are especially adapted for street illumination, it will be noted that herein there is provided a lamp pole 40 of conventional construction which has a downwardly extending supporting portion 42 secured to an outwardly extending arm 44. Attached to the supporting member 42 is a housing 46 formed of metal or the like within which there is adapted to be removably emplaced a lamp 48 employing the concepts of the present invention. This lamp 48 includes a casing 50 of glass or other suitable material having a coating 52 of a dull, non-reflecting material, preferably black, baked or otherwise applied thereto. Extending through the casing 50 from the supporting member 42 are conductors 52 and 54 which carry a filament 56 forming the source of illumination. A reflecting mirror 58 is affixed to the casing 48 behind the filament 56.

It is to be noted that the casing 50 is substantially cubical in shape, but has an integrally formed lens 60 provided with a ground glass surfacing 62 on the interior surface thereof. The lens 62 intersects the side walls of the casing 50 forming a peripheral substantially annular retaining surface 64. There is provided within the casing 50 a condensing lens 66 and a filter 68, the filter 68 being similar in construction to the filter 32 previously described.

Detachably secured to the housing 46 is a peripheral retaining member 70 substantially L-shaped in cross section which is adapted to support the casing 50 within the housing 46. This retaining member 70 is held in position relative to the housing by suitable fasteners 72 and a gasket 74 may be provided as necessary.

Since from the foregoing the construction and advantages of the lamp will be readily understood further explanation is believed to be unnecessary.

However, since numerous modifications will readily occur to those skilled in the art, after consideration of the foregoing specification and accompanying drawings, it is not intended to limit the invention to the exact construction shown and described, and accordingly all suitable modifications and equivalents may be resorted to.

What is claimed as new is as follows:

1. A lamp comprising a casing, an outer lens integrally formed with said casing, a light source in said casing, a condensing lens positioned between said light source and said outer lens, and a filter positioned between said condensing lens and said outer lens, a part of the interior surface of said casing having a coating of a substantially non-reflecting dark material, the part of the interior surface of said casing behind said light source being covered by a reflecting surface.

2. A lamp comprising a casing, an outer lens integrally formed with said casing, a light source in said casing, a condensing lens positioned between said light source and said outer lens, and a filter positioned between said condensing lens and said outer lens, a part of the interior surface of said casing having a coating of a substantially non-reflecting dark material, the part of the interior surface of said casing behind said light source being covered by a reflecting surface, said outer lens having an interior ground glass surfacing, said outer lens being provided with a fog penetrating amber coloring.

References Cited in the file of this patent

UNITED STATES PATENTS

| | | |
|---|---|---|
| 2,002,551 | Schmierer | May 28, 1935 |
| 2,315,549 | Singer | Apr. 6, 1943 |
| 2,453,194 | Buzzell | Nov. 9, 1943 |
| 2,618,759 | Hoyt | Nov. 18, 1952 |